United States Patent
Luedtke et al.

(10) Patent No.: US 9,550,422 B2
(45) Date of Patent: Jan. 24, 2017

(54) VEHICLE HIGH VOLTAGE INTERLOCK STARTUP

(71) Applicant: FORD GLOBAL TECHNOLOGIES, LLC, Dearborn, MI (US)

(72) Inventors: Daniel Richard Luedtke, Beverly Hills, MI (US); Fazal Urrahman Syed, Canton, MI (US); Edward William Haran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 14/156,552

(22) Filed: Jan. 16, 2014

(65) Prior Publication Data

US 2015/0197153 A1   Jul. 16, 2015

(51) Int. Cl.
*G01R 31/02* (2006.01)
*B60W 20/50* (2016.01)
*B60L 3/00* (2006.01)

(52) U.S. Cl.
CPC ........... *B60L 3/0023* (2013.01); *Y02T 10/7005* (2013.01)

(58) Field of Classification Search
CPC ............ B06L 3/00; B06L 3/04; G01R 31/007; G01R 31/02; G01R 31/08; G01R 31/3658; G01R 19/16571; G01R 31/025; B60W 20/50; B60K 1/00; B60K 6/00
USPC .............. 701/22, 32.3, 33.4, 34.2, 400, 527, 538,701/540, 71; 324/426, 503, 509, 555, 750.01, 324/765.01
See application file for complete search history.

(56) References Cited

U.S. PATENT DOCUMENTS

| | | | |
|---|---|---|---|
| 4,491,782 A | 1/1985 | Bellis et al. | |
| 5,949,806 A | 9/1999 | Ness et al. | |
| 7,602,140 B2* | 10/2009 | Asaumi | H02J 7/0019 320/104 |
| 2003/0029654 A1* | 2/2003 | Shimane | B60K 6/28 180/65.29 |
| 2003/0132730 A1* | 7/2003 | Ochiai | B60K 6/485 320/104 |
| 2009/0140745 A1* | 6/2009 | Williams | G01R 31/2829 324/522 |
| 2011/0202220 A1* | 8/2011 | Seta | B60L 1/00 701/22 |
| 2012/0303189 A1 | 11/2012 | Namuduri et al. | |
| 2015/0042156 A1* | 2/2015 | Murakami | H02J 7/0029 307/9.1 |

FOREIGN PATENT DOCUMENTS

EP            2489541 A1    8/2012

* cited by examiner

*Primary Examiner* — Tung X Nguyen
*Assistant Examiner* — Neel Shah
(74) *Attorney, Agent, or Firm* — David B. Kelley; Brooks Kushman P.C.

(57) ABSTRACT

A vehicle high voltage system may include switches (e.g., IGBTs, contactors, relays, etc.), wires, a traction battery, electrical components with electrical properties and at least one controller. The at least one controller may be programmed to modulate a switch to provide a testing voltage for the electrical components, which is less than an operating voltage of the battery, and in response to a current flow associated with the testing voltage being less than a predetermined threshold, stop current flow between the battery and electrical components.

9 Claims, 6 Drawing Sheets

VEHICLE HIGH VOLTAGE INTERLOCK STARTUP

TECHNICAL FIELD

This disclosure relates to the control of contactors, IGBTs, relays, etc. to protect a vehicle high voltage wiring and component infrastructure.

BACKGROUND

A hybrid-electric vehicle (HEV) or all-electric vehicle (EV) has a traction battery to store and provide energy for vehicle propulsion. The traction battery typically operates at over 100 volts, which is an increased voltage in comparison to a conventional vehicle battery voltage of 12 volts. The industry standard is that low voltage is less than 60 volts Direct Current (DC) and 30 volts Alternating Current (AC) calculated by root mean square (RMS). Voltages above this threshold are considered high voltage. The traction battery also has greater current capacity in comparison to a conventional battery, which can be in excess of 100 amps·hours. This increased voltage and current is used by an electric motor(s) to convert the electrical energy stored in the battery to mechanical energy in the form of a torque which is used to provide vehicle propulsion. The battery is connected to the electric motor via wires, connectors, capacitors, and other electrical components.

SUMMARY

A vehicle may have a high voltage system which may include a traction battery, electrical components with specific properties, a load, a power converter which is electrically connected between the battery and load, switches which may include IGBTs, MOSFETs, BJTs, relays, etc. and at least one controller. To check high voltage cable connectivity or if there is a fault with the electrical components or load, the controller may be programmed to cause the power converter to output a testing voltage to the load less than the operating voltage of the battery. If the output by the converter associated with the testing voltage indicates a fault between the battery and the load, the controller may be programmed to stop current flow between the battery and load.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
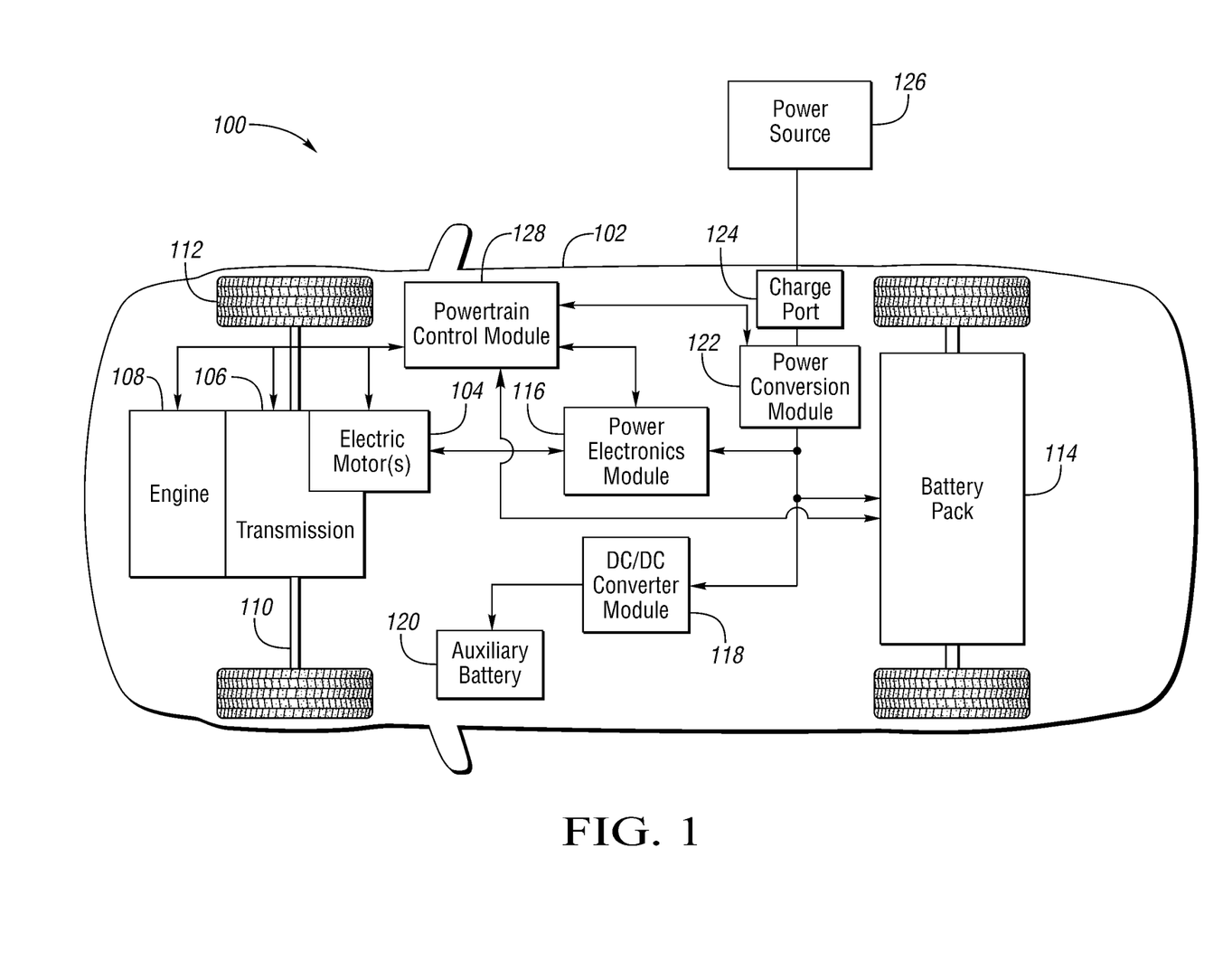
FIG. 1 is an example hybrid-electric vehicle with a battery pack.

FIG. 1 depicts an example of a plug-in hybrid-electric vehicle 100. The plug-in hybrid-electric vehicle 100 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The fraction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage vehicle system which includes the electric motor(s) 104, the power electronics module 116, the DC/DC converter module 118, the power conversion module 122, and the battery pack 114.

Figure 2:
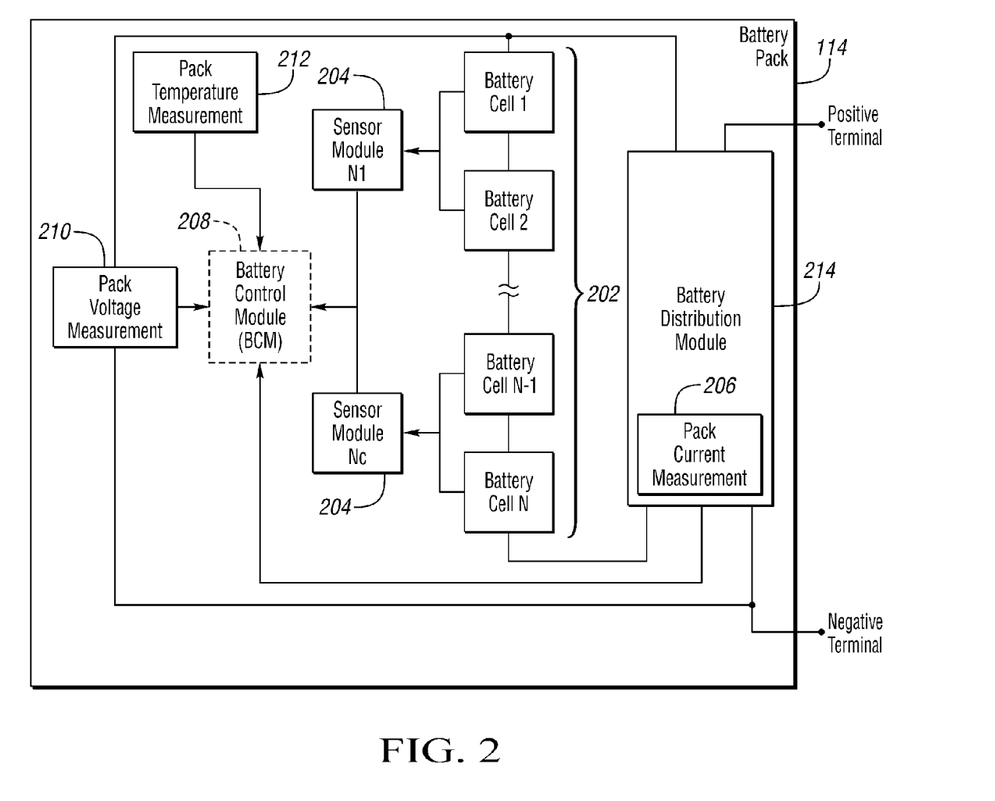
FIG. 2 is a battery pack arrangement comprised of battery cells and battery cell monitoring and controlling systems.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200.

Figure 3:
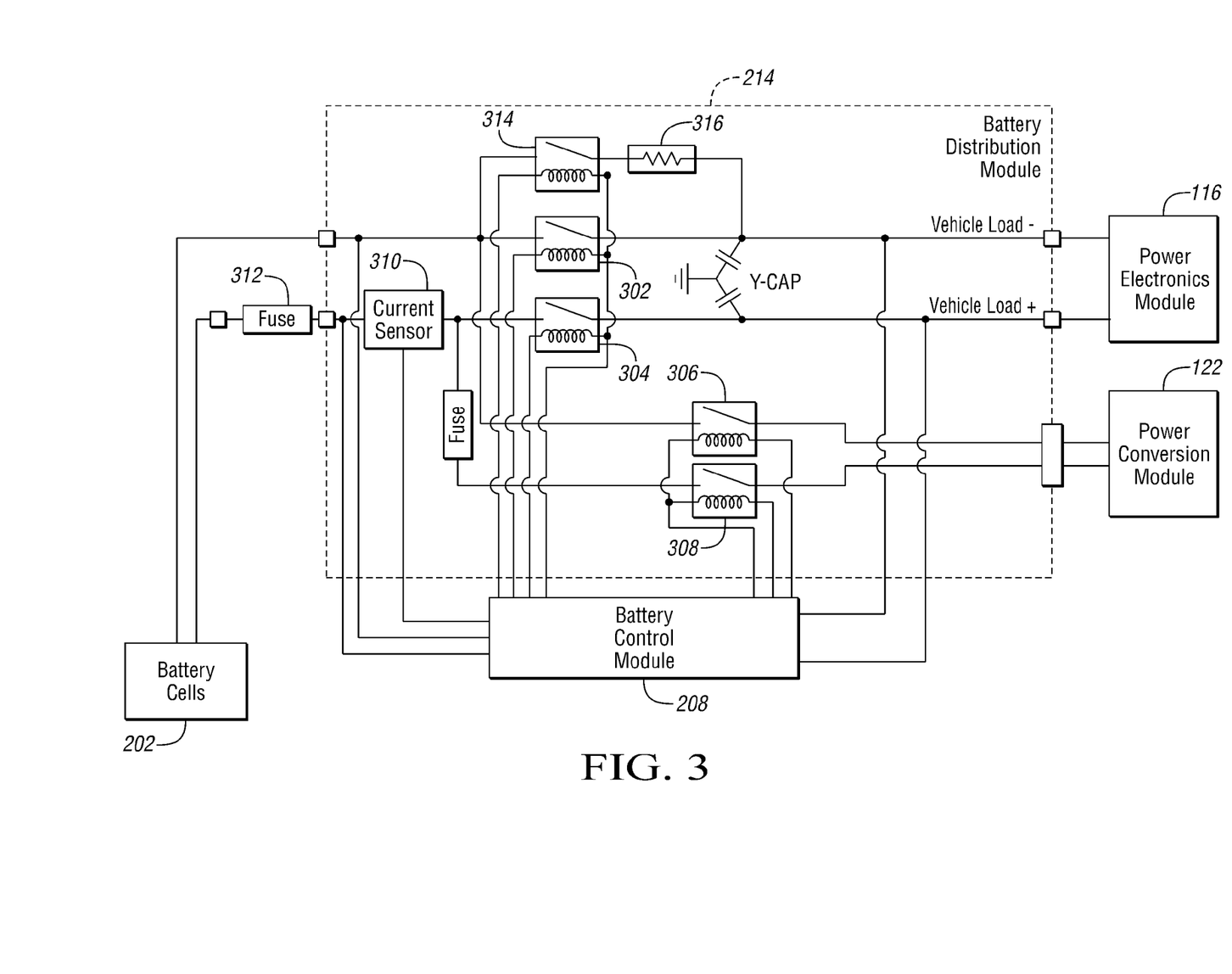
FIG. 3 is a wiring diagram of an example hybrid electrical vehicle.

FIG. 3 is an illustration of a power electronics distribution module 214. This battery distribution module (BDM) 214 contains the high voltage switches (302, 304, 306, 308 and 314) used to connect and disconnect the high voltage components. These high voltage switches (302, 304, 306, 308 and 314) can be relays, insulated gate bipolar junction transistors (IGBTs), metal oxide semiconductor field effect transistors (MOSFETs), bipolar junction transistors (BJTs), or other electro-mechanical or solid state switches. The battery cells 202 provide the voltage and current which flows through switches 302 and 304 to the power electronics module 116. The current is measured in a current sensor block 310. The current may flow as a result of switch 304 being closed and either switch 302 or 314 being closed with power moving between the battery cells 202 and the power electronics module 116. Switch 314 in conjunction with resistor 316 is a pre-charge circuit which is used to limit the current flow into system while the system is powering up. Also, current may flow as a result of switches 308 and 306 being closed with power moving between the battery cells 202 and the power conversion module 122. The current also may also pass through a CID 312 which can include a fuse or circuit breaker, however the CID is not required as the system may be configured to protect the circuit over the complete range of operating amp·hour time periods. The BDM 214 also may include switches 306 and 308 which alternatively connect the battery cells 202 with the power conversion module 122.

Figure 4:
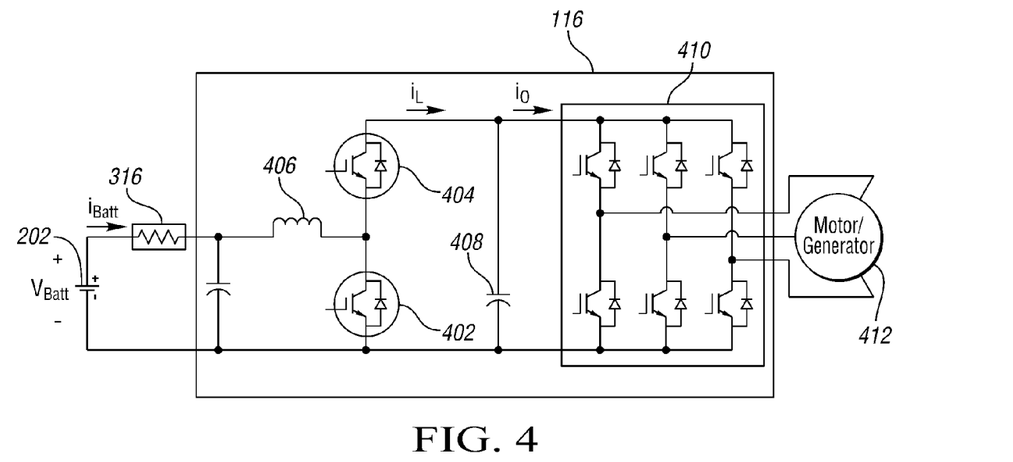
FIG. 4 is a wiring diagram of a motor/generator circuit employing a boost converter.

FIG. 4 is a wiring diagram of a boost converter circuit 116 that may drive one or more motor/generator 412. The battery cells 202 having a voltage and ability to supply a current are electrically connected to the battery distribution block 214. The battery distribution module 214 is connected to the power electronics module 116. The power electronics module 116 may include a boost circuit with an inductor 406, a switch 402 to charge an electric field in the inductor 406 and a switch 404 to discharge the electric field thereby changing the voltage to drive the motor/generator 412. This DC/DC convertor circuit will convert the battery voltage to an operational voltage which may be greater than the battery cell voltage. The power converter 116 may use IGBTs, BJTs, MOSFETs, relays, or other electro-mechanical or solid state switches at location 402 and 404. The use of IGBTs with Fast Recovery Diodes (FRDs) in this diagram is exemplary and may be accomplished using MOSFETs, BJTs, or other electro-mechanical or solid state switches. The capacitor 408 is used to filter the voltage generated by the DC/DC convertor so that the operational voltage applied to the motor control switches 410 is generally stable. This boost circuit is intended to change the voltage of the high voltage battery 202 to an operating voltage that is greater than the battery voltage. An example of this is a high voltage battery of 90-400 volts being boosted to an operating voltage of 100-1200 volts.

Figure 5:
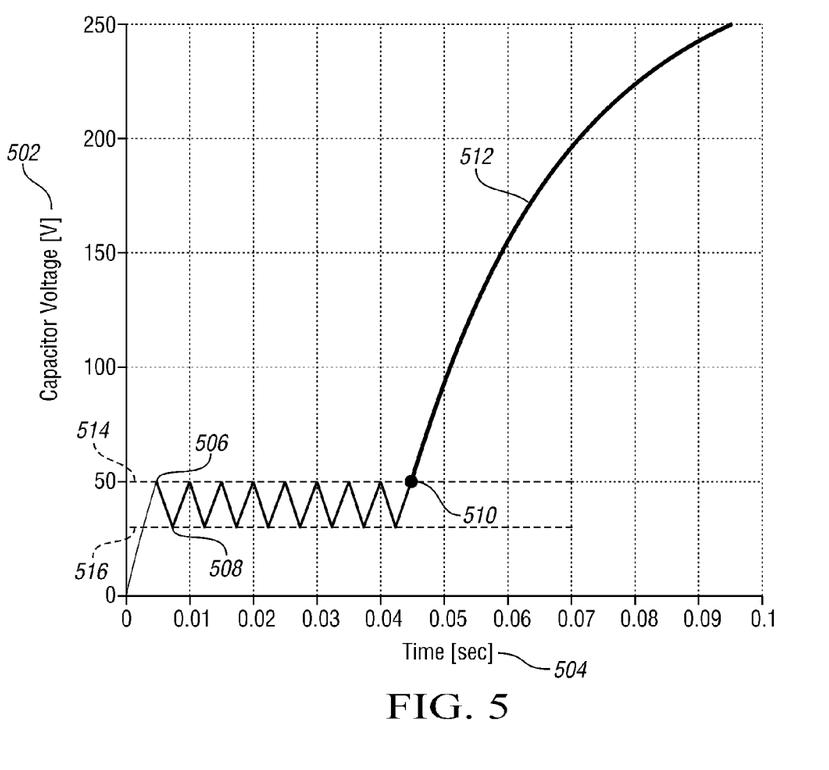
FIG. 5 is a graph that illustrates capacitor voltage with respect to time for components of a vehicle high voltage electrical system.

FIG. 5 is a graph that illustrates capacitor voltage 502 with respect to time 504 for electrical components of a vehicle high voltage electrical system. As the system is powered up with the pre-charge resistor circuit 314 closed, the voltage across the capacitor 408 increases as it is charged until it reaches an upper threshold voltage level 514 at point 506. This upper threshold voltage level 514 is chosen to be a low voltage less than 60 volts DC. Upon reaching the upper threshold voltage at 506, the control system closes switch 402 and the charging of the capacitor 408 stops as all current is now directed through switch 402 to charge the field of the inductor 406. The current is limited by the pre-charge resistor 316. When the switch is closed at the point 506, the capacitor 408 voltage may drop due to the motor or generator load demanded by the high voltage interlock HVIL test. If the voltage level drops below a lower threshold level 516 at point 508, the control system will open the switch 402 and the capacitor 408 will begin to charge. In this example, switch 404 is a directional switch which allows current to flow in one direction, but not in the other, as such, switch 404 may be left closed through this test. If switch 404 is a bi-directional switch allowing current to flow in either direction, switch 404 will be switched complementarily to switch 402. This feedback mechanism will maintain the voltage across the capacitor 408 between the upper threshold level 514 and lower threshold level 516. While the voltage across the capacitor is within this voltage range, the controller may perform an interlock test to check the integrity of the high voltage system and the high voltage components. The hardware interlock test is complete at point 510, at which point the high voltage system charging will continue as indicated by 512 if the test passes. In the event that the test does not pass, the contactors will open and the battery will be disconnected from the high voltage system and the voltage on the high voltage system will never exceed 60V, which is a low voltage.

Figure 6:
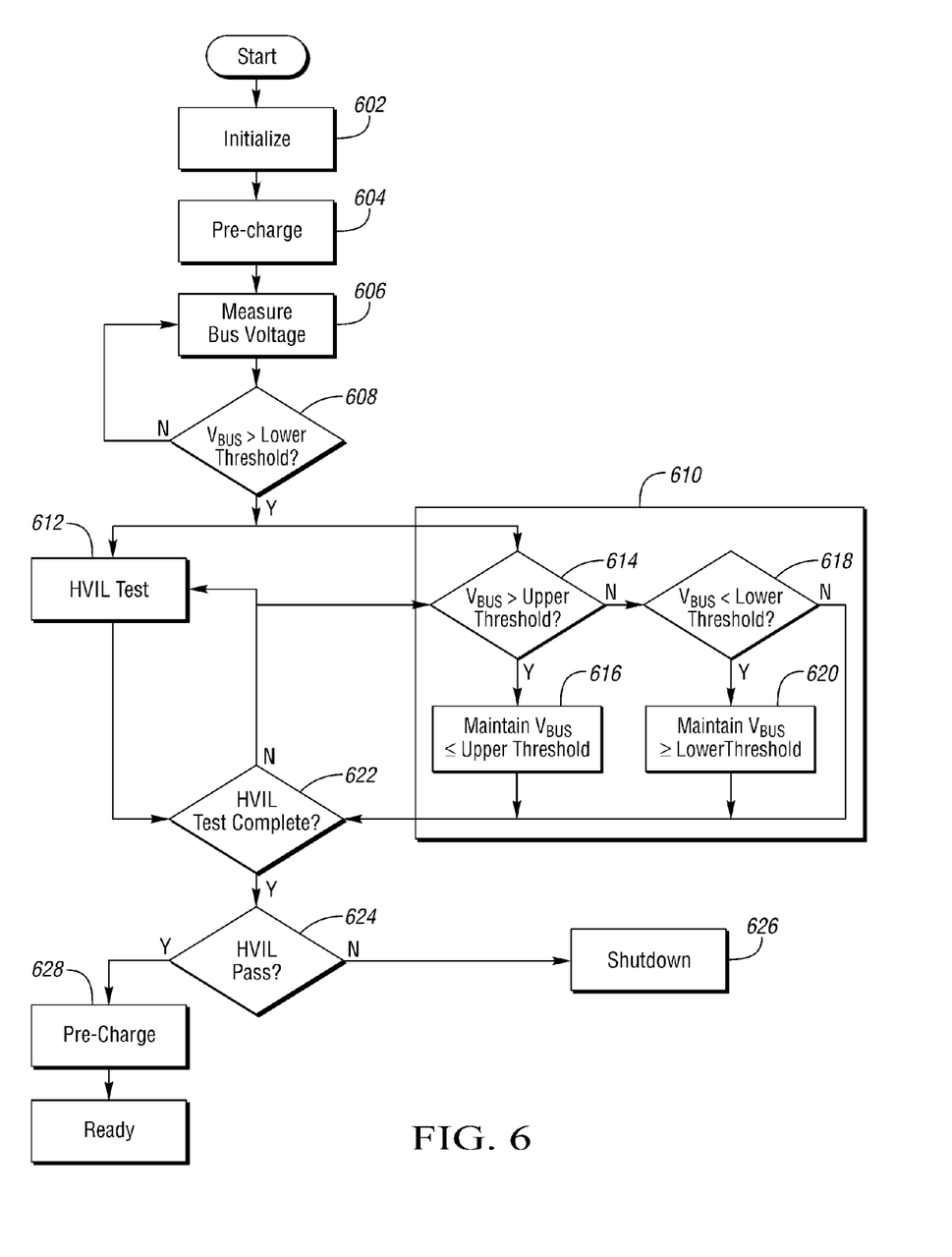
FIG. 6 illustrates a flow diagram of an algorithm used to protect a vehicle high voltage electrical system.

FIG. 6 is a flow diagram of a high voltage control system and interlock which may be used in a hybrid electric vehicular system or an electric vehicular system. The system initialization is in block 602 which checks to see if the contactors are closed and if the contactors are not closed. The system closes the contactors so that a current flows from the battery to the electrical components. When the contactors are closed and a current begins flowing from the battery, the high voltage system begins to charge. The pre-charging of the high voltage system is performed in block 604. This initial pre-charging 604 is followed by a measurement of the high voltage system's voltage in block 606. The pre-charging and voltage measurement continues until the voltage is above a lower threshold voltage level 516, which is tested in block 608. After the voltage increases above the lower threshold voltage level 516, an HVIL test can be performed in block 612 while the voltage on the high voltage system is maintained between the upper threshold voltage level 514 and the lower threshold voltage level 516, which is done in block 610. Block 610 may include an upper voltage level test 614, which when the voltage on the bus exceeds the upper threshold voltage level 514 a contactor is opened to stop the voltage from increasing further. Block 610 may also include a lower voltage level test 618, which when the voltage on the bus drops below a lower threshold voltage level 512 a contactor is closed to allow the flow of current from the battery to the high voltage system. Both the HVIL testing 612 and the voltage feedback mechanism 610 will continue until the HVIL test is complete as determined in block 622. The results of the HVIL test are evaluated in block 624. An example HVIL test may include multiple tests in which the motor control switches 410 are selectively engaged to check conductivity of each phase of the electric machine 412 at a low voltage and not the normal operational voltage. In this example if a connector is not properly seated or connected, minimum current would flow, which would not exceed a lower predetermined threshold. This current measurement less than the lower threshold would indicate a connection fault. Likewise if there was a short circuit condition, the current flow would exceed an upper predetermined threshold. Therefore it may be desirable in this example to look for current flow to be within a predetermined range to indicate a proper connection and operational status of the components. If the results indicate that the test passed, the high voltage system is allowed to continue pre-charging over the low voltage threshold limit 514. The continued pre-charging is performed in block 628. If the test results indicate a fault, then the system is shut-down in block 626.

Figure 7:
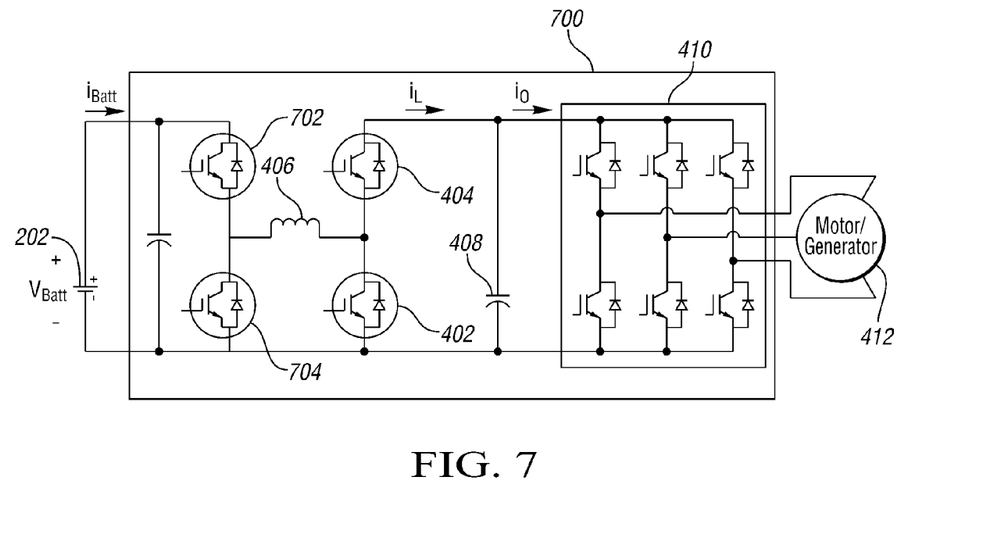
FIG. 7 is a wiring diagram of a motor/generator circuit employing a buck-boost converter.

FIG. 7 is a wiring diagram of a buck-boost converter circuit 700 that may drive one or more motor/generator 412. The battery cells 202 are electrically connected to the battery distribution block 214. The battery distribution module 214 is connected to the power electronics module 700. The power electronics module 700 may include a boost circuit with an inductor 406, a switch 402 to charge an electric field in the inductor 406, and a switch 404 to discharge the electric field thereby changing the voltage to drive the motor/generator 412. This power electronics module 700 may also include a buck circuit using inductor 406 and switches 702 and 704. This DC/DC convertor circuit will convert the battery voltage to an operational voltage which may be greater than the battery cell voltage. The buck-boost power converter 700 may use IGBTs, BJTs, MOSFETs, relays, or other electro-mechanical or solid state switches at locations 402 and 404. The use of IGBTs with Fast Recovery Diodes (FRDs) in this diagram is exemplary and may be accomplished using MOSFETs, BJTs, or other electro-mechanical or solid state switches. In this example, switch 404 is a directional switch which allows current to flow in one direction, but not in the other. As such, switch 404 may be left closed through this test. If switch 404 is a bi-directional switch allowing current to flow in either direction, switch 404 will be switched complementarily to switch 402. The capacitor 408 is used to filter the voltage generated by the DC/DC convertor so that the operational voltage applied to the motor control switches 410 is generally stable. This buck-boost circuit is intended to change the voltage of a high voltage battery 202 (having a voltage greater than 60V DC), to an operating voltage different than the battery voltage. An example of this is a high voltage battery of 90-400 volts being bucked or boosted to an operating voltage of 100-1200 volts.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

Although exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

Although various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery having an operating voltage;
    a power converter electrically connecting the battery and a motor; and
    at least one controller programmed to
        in response to activation of the motor, cause the converter to output a test voltage to the motor less than the operating voltage of the battery,
        in response to output by the converter associated with the test voltage being indicative of a fault, stop current flow between the battery and motor, and
        in response to the output falling within a predetermined range indicative of a connection between the battery and motor, connect the battery and motor such that current flows between the battery and motor to achieve the operating voltage.

2. The vehicle of claim 1, wherein the output being greater than the predetermined range is indicative of a fault.

3. The vehicle of claim 1, wherein the at least one controller is further programmed to, in response to the output falling within the predetermined range, activate a pre-charge circuit connected to the battery and motor.

4. The vehicle of claim 1, wherein the test voltage is less than 60 volts and the operating voltage is greater than 100 volts.

5. The vehicle of claim 4, wherein the test voltage is greater than 12 volts.

6. A method comprising:
    modulating a switch connected with a battery and motor to provide a test voltage for the motor less than an operating voltage of the battery;
    preventing current flow from the battery to the motor responsive to output associated with the test voltage being less than a predetermined amount; and
    enabling current flow from the battery to the motor at the operating voltage responsive to the output falling within a predetermined range.

7. The method of claim 6 further comprising preventing current flow from the battery to the motor responsive to the output being greater than the predetermined range.

8. The method of claim 6, wherein the test voltage is less than 60 volts and the operating voltage is greater than 100 volts.

9. The method of claim 8, wherein the test voltage is greater than 12 volts.

* * * * *